(No Model.)

J. RICHTER.
VELOCIPEDE.

No. 259,212. Patented June 6, 1882.

WITNESSES:
Otto Hufeland
William Miller

INVENTOR
Julius Richter
BY VanSanturns & Hauff
his ATTORNEYS

UNITED STATES PATENT OFFICE.

JULIUS RICHTER, OF UNION HILL, NEW JERSEY, ASSIGNOR, BY DIRECT AND MESNE ASSIGNMENTS, TO GEORGE F. FREEDMAN, OF NEW YORK.

VELOCIPEDE.

SPECIFICATION forming part of Letters Patent No. 259,212, dated June 6, 1882.

Application filed April 13, 1882. (No model.)

*To all whom it may concern:*

Be it known that I, JULIUS RICHTER, a citizen of Germany, residing at Union Hill, in the county of Hudson and State of New Jersey, have invented new and useful Improvements in Propellers, of which the following is a specification.

This invention consists in the combination, with the hind wheels of a vehicle and with the axle on which the same are firmly mounted, of a crank-shaft which is geared together with said axle, an eccentric-disk (one or more) mounted on said crank-shaft, lever-pawls connected to said eccentric, and ratchet-wheels mounted on an intermediate shaft which is geared together with the axle of the hind wheels, so that by the action of the lever-pawls the propeller is readily started, and when started it can be driven with great velocity.

Figure 1:
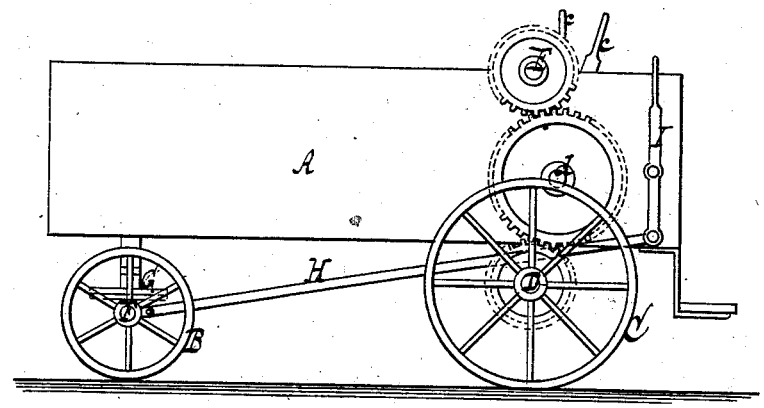
Figure 2:
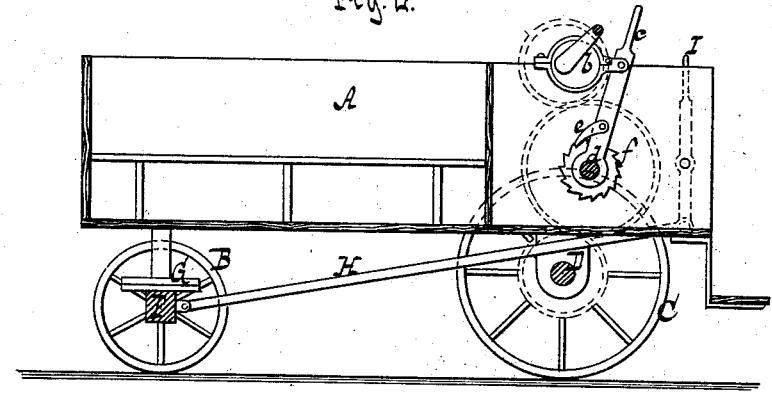
Figure 3:
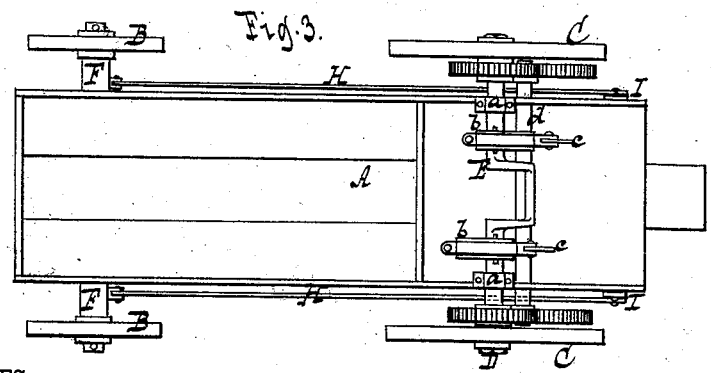

In the accompanying drawings, Figure 1 designates a side view. Fig. 2 is a longitudinal vertical section. Fig. 3 is a plan or top view.

Similar letters indicate corresponding parts.

In the drawings, the letter A designates the body of a wagon. B B are the front or steering wheels, and C C are the hind or driving wheels. These driving-wheels are firmly mounted on an axle, D, and this axle is geared together with a crank-shaft, E, that has its bearings in boxes $a$, secured to the upper part of the body A, so that by turning this crank-shaft the axle D can be turned and the wagon propelled with great velocity.

On the crank-shaft E are firmly mounted two eccentric-disks, $b\ b$; the straps of which are pivoted to levers $c\ c$, which swing loosely on an intermediate shaft, $d$. Each of the levers $c$ carries a pawl, $e$, which engages with a ratchet-wheel, $f$, mounted on the intermediate shaft, $d$. This intermediate shaft is geared with the axle D. If the crank-shaft is turned, therefore, the lever-pawls act with great force upon the ratchet-wheels $f$, and the operation of starting the wagon from a state of rest is materially facilitated. In going uphill the levers $c\ c$ are disconnected from the eccentric-straps, so that they can be operated by hand and the wagon propelled with sufficient force to mount the hill.

The front wheels, B B, are mounted loosely on an axle, F, which is connected to the body A by a king-bolt, so that it can be turned round, and it is steadied by the fifth-wheel G in the manner usually practiced.

From the axle F extend two rods, H, to levers I, which are pivoted to the sides of the body A. By means of these levers the propeller is steered.

What I claim as new, and desire to secure by Letters Patent, is—

The combination, substantially as hereinbefore described, of the body A, the axle D, the driving wheels C C, mounted firmly on this axle, the crank-shaft E, which is geared together with the axle D, the eccentrics mounted on the crank-shaft, the lever-pawls detachably connected to said eccentrics, and the ratchet-wheels mounted on an intermediate shaft which is geared together with the axle D.

In testimony whereof I have hereunto set my hand and seal in the presence of two subscribing witnesses.

JULIUS RICHTER. [L. S.]

Witnesses:
W. HAUFF,
E. F. KASTENHUBER.